US011669581B2

United States Patent
Shetty et al.

(10) Patent No.: US 11,669,581 B2
(45) Date of Patent: Jun. 6, 2023

(54) AUTOMATED HYPERLINKS FOR DRAFT EMAILS

(71) Applicant: VMware, Inc., Palo Alto, CA (US)

(72) Inventors: Rohit Pradeep Shetty, Bangalore (IN); Shree Harsha Shedigumme, Bangalore (IN); Sudharsan Thurnatti Sathiamoorthy, Bangalore (IN); Pushkal Maheshwari, Bangalore (IN)

(73) Assignee: VMware, Inc., Palo Alto, CA (US)

(*) Notice: Subject to any disclaimer, the term of this patent is extended or adjusted under 35 U.S.C. 154(b) by 125 days.

(21) Appl. No.: 17/388,540

(22) Filed: Jul. 29, 2021

(65) Prior Publication Data

US 2021/0357472 A1 Nov. 18, 2021

Related U.S. Application Data

(63) Continuation of application No. 16/413,976, filed on May 16, 2019, now Pat. No. 11,100,186.

(51) Int. Cl.
| | |
|---|---|
| *G06F 17/00* | (2019.01) |
| *G06F 16/955* | (2019.01) |
| *G06F 16/903* | (2019.01) |
| *H04L 51/08* | (2022.01) |

(52) U.S. Cl.
CPC .... *G06F 16/9558* (2019.01); *G06F 16/90335* (2019.01); *H04L 51/08* (2013.01)

(58) Field of Classification Search
CPC ........... G06F 16/9558; G06F 16/90335; H04L 51/08; H04L 51/18
See application file for complete search history.

(56) References Cited

U.S. PATENT DOCUMENTS

| | | | | |
|---|---|---|---|---|
| 6,138,129 | A | * | 10/2000 | Combs ................ G06F 16/9558 707/E17.042 |
| 9,460,209 | B1 | * | 10/2016 | Cheng ..................... G06F 3/167 |
| 2006/0248189 | A1 | | 11/2006 | Jerrard-Dunne |
| 2008/0126400 | A1 | | 5/2008 | Mitsuishi |
| 2008/0243793 | A1 | | 10/2008 | Hallett |
| 2013/0174002 | A1 | | 7/2013 | Jones |
| 2014/0089435 | A1 | * | 3/2014 | Jackson ................. H04L 51/52 709/206 |
| 2014/0297759 | A1 | | 10/2014 | Mody |
| 2015/0350259 | A1 | | 12/2015 | Garg |
| 2016/0323217 | A1 | | 11/2016 | Subramani |
| 2018/0246983 | A1 | * | 8/2018 | Rathod ............... G06F 16/9566 |

* cited by examiner

*Primary Examiner* — Laurie A Ries
(74) *Attorney, Agent, or Firm* — Clayton, McKay & Bailey, PC (57) ABSTRACT

Examples described herein can identify items from third-party or backend services, obtain relevant information for those items, and automatically populate hyperlinks relevant to those items in a draft email. A regular expressions search can be executed on the text of a draft email. When a match is found, the email client can request, from a server, an object associated with the matching expression. The server can obtain the object, using one or more connectors that provide access to a backend system, and provide it to the email client. The email client can extract a URL from the object and enter the URL into a links table stored on the user device. The email client can pull the URL from the links table and use it to automatically generate a hyperlink of the regular expression within the body of the draft email.

20 Claims, 5 Drawing Sheets

AUTOMATED HYPERLINKS FOR DRAFT EMAILS

This application is a continuation of U.S. patent application Ser. No. 16/413,976, titled "AUTOMATED HYPERLINKS FOR DRAFT EMAILS" and filed May 16, 2019, which is incorporated herein in its entirety for all purposes.

BACKGROUND

Email communication continues to provide an important avenue for workplace communication. In the enterprise environment, an email often references items that require follow-up by the recipient—such as a person's name or email address, a project, a customer identity, or a ticket. In most cases, the recipient must perform an action, or a series of actions, to access the item for following up. These actions lead to inefficiencies in an employee's workflow.

Today's email clients provide limited features to decrease these inefficiencies. For example, a uniform resource locator ("URL") typed into a draft email can be automatically turned into a hyperlink directed to that URL. Similarly, an email address can but automatically turned into a hyperlink that launches a new email with that email address listed as a recipient. These features do not require any information from outside the email client itself. In other words, the email client is able to recognize the form of a URL or email address and apply an appropriate hyperlink without information from any other source.

However, current email clients fall short when a draft email references an item that is not known to the email client. For example, a draft email can identify a project name or identity for a project managed by a backend service. Similarly, a draft email can identify a customer name or identity for a customer registered in a third-party service. Today's email clients are unable to recognize these items. And even if they could recognize these items, the email client would be unable to obtain information relevant to these items in order to create a useful hyperlink.

As a result, a need exists for an email system that can identify items from third-party or backend services, obtain relevant information for those items, and automatically populate hyperlinks relevant to those items in a draft email.

SUMMARY

Examples described herein include systems and methods for providing hyperlinks to a draft email on a user device. An example can include performing a regular expressions search on the text of the draft email. This can occur as an ongoing process, as the user is drafting the email. The regular expressions search can be configured to locate expressions relevant to particular backend systems or third-party services available to the user or the enterprise. The example method can also include identifying a matching regular expression within the text of the draft email.

The example method can include requesting, from a remote server, an object associated with the matching regular expression. The remote server can obtain the object using one or more connectors that provide access to a backend system, such as a system associated with a third-party service. The backend system can provide the object to the remote server in response to the request. The object can include any type of data structure. The data structure can include a URL that identifies a storage location associated with the object.

The remote server can return the object to the email client. The email client, in turn, can extract the URL from the object and enter the URL into a links table that is stored on the user device. The links table can associate the regular expression with the URL, such that future instances of that regular expression can be locally matched to the URL. The email client can then access the links table to obtain the URL and automatically generate a hyperlink of the regular expression within the body of the draft email, using the URL. The URL can also be added manually, based on the user selecting a word or expression within the draft email. In another example, a links table can be maintained on a remote server. This can allow for the links table to pool regular expressions used by multiple devices.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing hyperlinks to a draft email on a user device. An email system is described that can identify items from third-party or backend services, obtain relevant information for those items, and automatically populate hyperlinks relevant to those items in a draft email.

In an example method, a regular expressions search can be executed on the text of a draft email. The search can be executed based on time intervals or based on a user typing one or more new words. When a match is found, the email client can check a links table to determine if a matching URL is saved. If no URL is saved for the matching expression, the email client can request, from a remote server, an object associated with the matching expression.

The remote server can obtain the object using one or more connectors that provide access to a backend system, such as a third-party service. Having received the object, the remote server can provide it to the email client. The email client can extract a URL from the object and enter the URL into a links table stored on the user device. The links table can associate regular expressions with matching URL indicating a storage location of an object related to the expression. The email client can pull the URL from the links table and use it to automatically generate a hyperlink of the regular expression within the body of the draft email. The URL can also be added manually, based on the user selecting a word or expression within the draft email.

In another example, the links table can be stored at a links server that is separate from the server discussed above. The email client can check the links table at the links server before requesting an object. In this example, the links table can be updated by various users within an enterprise, thereby sharing information to increase workplace efficiency.

Figure 1:
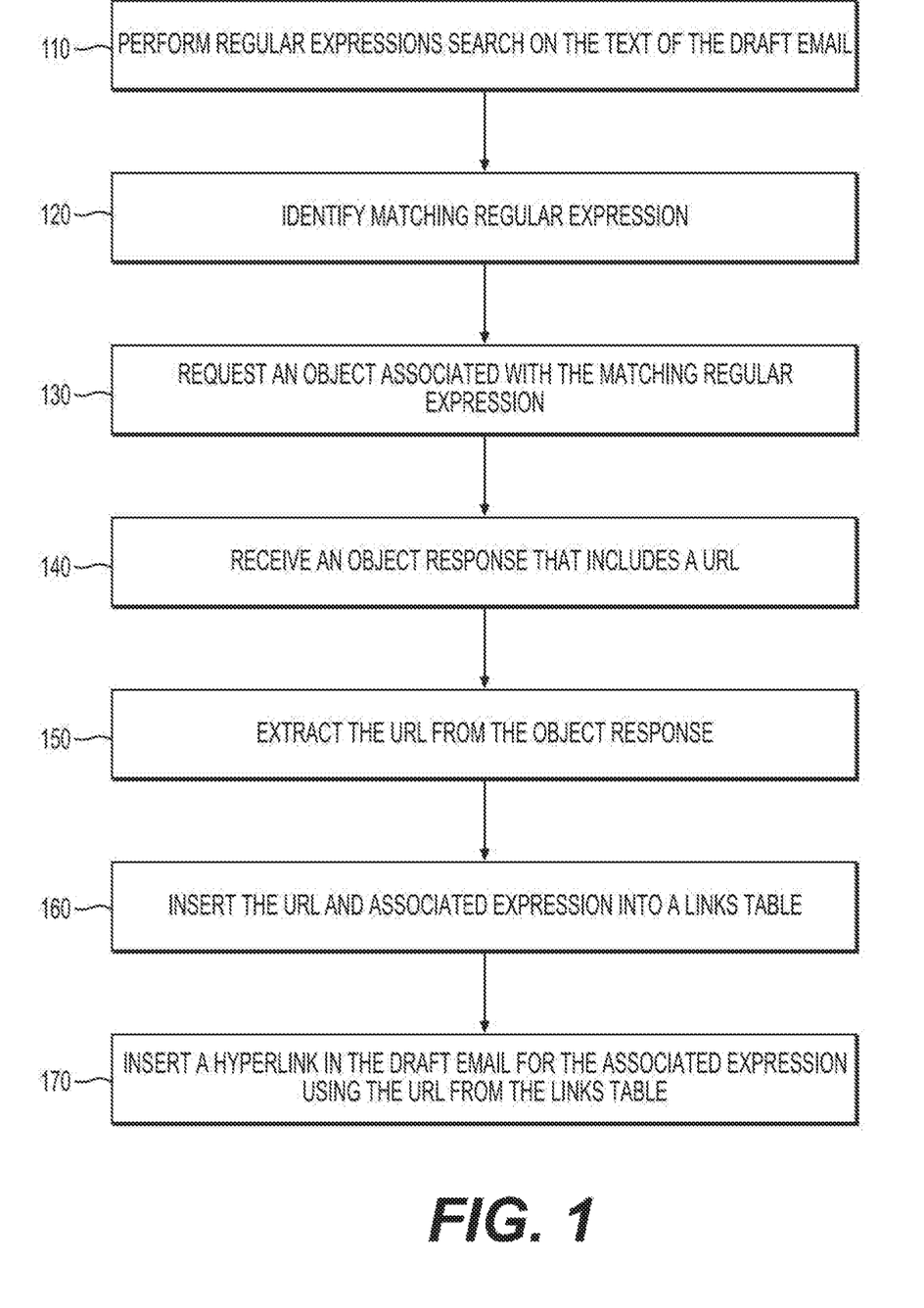
FIG. 1 is a flowchart of an example method for providing hyperlinks in a draft email on a user device.

FIG. 1 provides a flowchart of an example method for providing hyperlinks in a draft email on a user device. Stage 110 of the example method can include performing a regular expressions search on the text of a draft email. The regular expressions search can be carried out by an email client, such as VMWARE's BOXER. The regular expressions search can be one or more searches conducted based on one or more patterns that include letters, numbers, symbols, or any combination thereof. The regular expressions used for the search can be stored at the user device. In some examples, a server provides regular expressions to use for the search. The regular expressions stored at the user device can be updated by the server when new expressions are available or when the server otherwise communicates with the user device. In one example, different regex files correspond to different backend systems, with each file including regular expressions that are relevant for the corresponding backend system.

The regular expressions can relate to any information or data structure. In some examples, the regular expressions can relate to objects associated with a backend system, such as a third-party service. Example backend systems include SALESFORCE, JIRA, and CONCUR. Typically, an email client on a user device will not have direct access to the backend systems. As a result, the email client can obtain regular expressions related to those backend systems from a server, such as a mobile flows server. The mobile flows server can utilize various connectors that allow it to make API calls to the various backend systems and retrieve objects or other information.

In some examples, the mobile flows server can also generate regular expressions to be used for searching at the email client. For example, the mobile flows server can query a backend system to determine a naming convention for a type of object stored at the backend system. The mobile flows server can then use that naming convention to generate a regular expressions search that would capture particular instances of that naming convention with a draft email. In some examples, the backend system can provide regular expressions to use for the searches. Additionally, an administrator can manually create regular expressions based on their knowledge of objects associated with a backend system. Regardless of how or where they are configured, the regular expressions can be stored locally on the user device for quick access during email drafting. In some examples, a user is required to opt-in to a mobile flows system that allows functionality provided by the mobile flows server.

The email client can utilize the stored regular expressions to perform searches on the text of a draft email. The searches can be performed periodically, in one example. The time period can be based on the amount of time elapsed since a previous search was performed, the amount of time since the user opened the draft email, or the amount of time since the user typed in the draft email. In another example, the searches can be performed based on the number of characters typed into the draft email. For example, the searches can be performed every time the user types another 100 characters. In yet another example, the search can be ongoing such that each new word is searched as soon as it has been typed.

The email client can parse the text of the draft email and use it as input for one or more regular expressions algorithms. In some examples, when the email client has already performed a previous regular expressions search, a subsequent search can be limited to text that was added to the draft email after the previous search. In this manner, the email client can avoid re-searching the same text over and over. Stage 120 can include identifying a matching regular expression as a result of searching.

Stage 130 can include requesting an object associated with a matching regular expression. In some examples, this stage can include, before requesting the object, searching a links table for a URL associated with the matching regular expression. This step is explained in more detail with respect to FIGS. 2 and 3. If the email client is unable to obtain a URL from a links table, then stage 130 can include requesting an object from a server, such as the mobile flows server mentioned previously. As described in more detail with respect to later examples, an asynchronous thread running within the email client can send a request to a server, such as the mobile flows server, requesting an object associated with a particular term or phrase that matched the regular expressions search.

The server receiving the request can access an appropriate backend system in order to obtain the requested object. For example, the server can compare the regular expression against expression lists for multiple backends and determine which backend is implicated based on a match. If the server receiving the request is the mobile flows server, it can use a preconfigured connector to make an API call to the relevant backend system. If the server receiving the request is a different server, such as a links server discussed later, then that server can contact the mobile flows server and request the object. The mobile flows server, in turn, can access the backend system to retrieve the object. In some examples, retrieving the object includes accessing a data storage location managed by a backend system. The storage location can be part of the mobile flows server or located remotely from the mobile flows server, in various examples.

At stage 140, the email client can receive an object response that includes a URL. For example, the object can include a term-URL pairing that includes a term or group of terms from the draft email that matched the regular expressions search, along with a corresponding URL. The URL can indicate a storage location at which the user can access information relevant to the term or group of terms. In some examples, the storage location can include a file described by the term or group of terms. In another example, the storage location can include a web location that displayed information relevant to the term or group of terms.

At stage 150, the email client can extract the URL from the object response. This stage can include copying the URL from a column of the object data structure, for example. The email client can then insert the extracted URL, along with the associated matching regular expression, into a links table at stage 160. In some examples, the links table is a table having at least two columns, with one column including matching regular expressions and the other column including URLs associated with each of the matching regular expressions. In some examples, more than one URL can be associated with a particular regular expression. In that case, the links table can include multiple entries in the URL column for the regular expression. Alternatively, the links table can include duplicate entries in the expression column for the regular expression, with each entry corresponding to a different URL. As discussed with respect to FIG. 3, in some examples the links table is stored remotely, in which case stage 160 can be performed by a remote server rather than by the email client.

Stage 170 can include inserting a hyperlink into the draft email for the associated expression. This stage can include accessing the links table, determining an entry that matches the regular expression of interest, and extracting a URL associated with that entry. This stage can also include generating and inserting a hyperlink for the text of the email associated with the regular expression. The hyperlink can provide a clickable link to a file, storage location, or web location associated with the regular expression.

Figure 2:
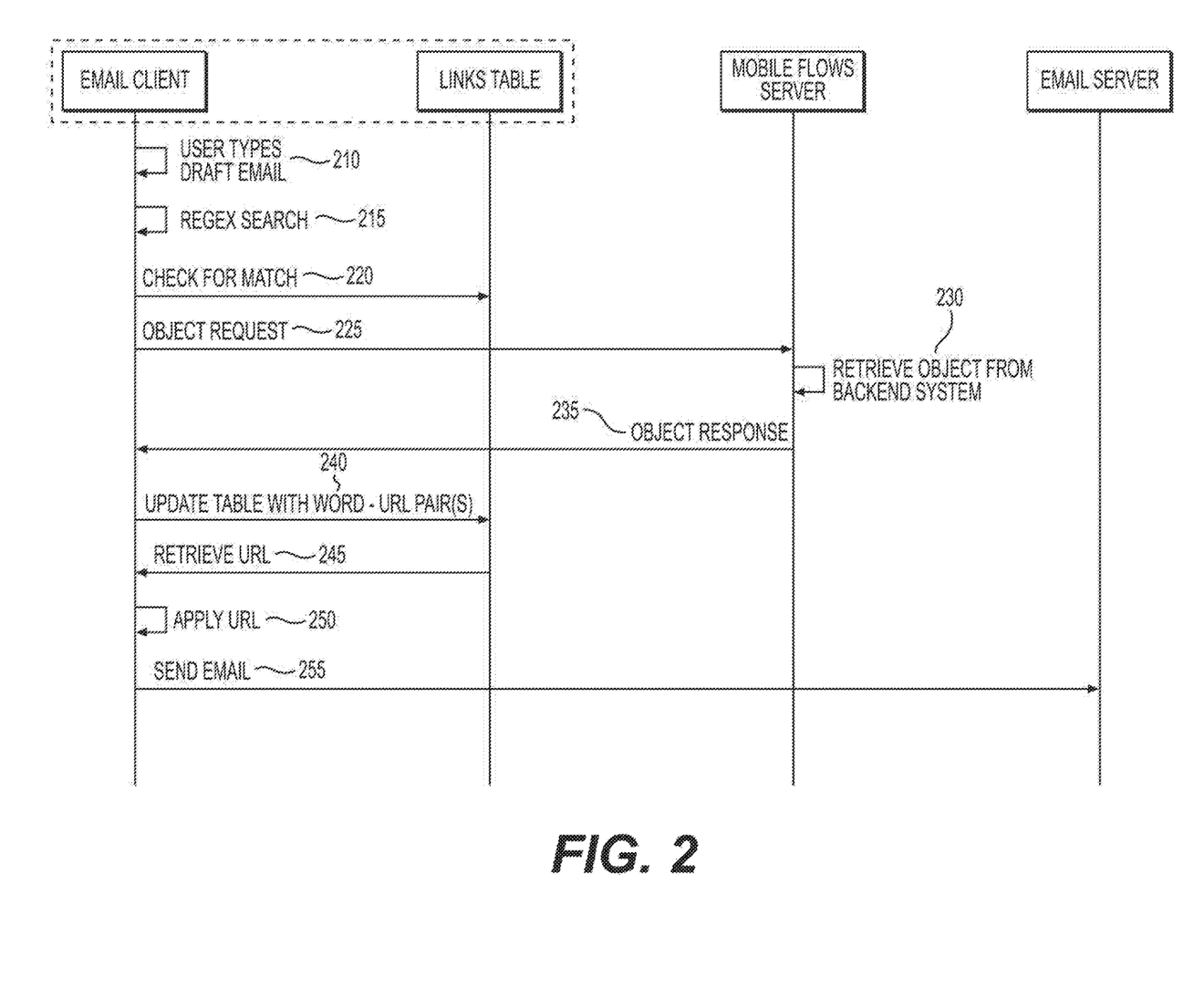
FIG. 2 is a sequence diagram of an example method for providing hyperlinks in a draft email on a user device.

FIG. 2 provides a sequence diagram of an example method for providing hyperlinks in a draft email on a user device, using a links table that is stored locally on the user device. In the drawing, the email client and links table are associated with a dashed-line box to indicate that the links table and email client are both associated with the same user device.

At stage 210, a user can begin typing a draft email in the email client. The draft email can be launched using known techniques within the email client, such as selecting an icon associated with creating a new email or selecting an icon associated with replying to or forwarding an email. The user can then simply begin typing in the draft email. The email client can detect the typing by the user and perform a regular expressions search at stage 215. The regular expressions search can utilize any number of regular expressions stored at the user device and accessible by the email client. The regular expressions can be provided by a remote server, such as the mobile flows server described in later stages. The regular expressions stored at the user device can be updated by the server when new expressions are available or when the server otherwise communicates with the user device, as described above with respect to FIG. 1.

The email client can perform regular expressions searches according to various rules or schedules. In one example, the searches can be performed periodically, based on a predetermined time period. The email client can begin a timer when a draft email is launched or when a user begins typing in a draft email. When the timer expires, the email client can perform a search on the text of the draft email and start a new timer. When the new timer expires, the email client can search either the full text of the draft email or only the text added since the previous search, and also begin another timer. This process can then be repeated.

In other examples, the email client can perform searches based on the number of characters or terms typed by the user in the draft email. For example, the email client can be configured to perform the search after detecting that 10, 20, 50, or 100 characters have been typed since the previous search. In another example, the email client can be configured to perform the search after detecting that a 1, 5, or 10 new terms, for example, have been typed since the previous search. In still another example, a regular expressions search is performed after each word is typed.

When a regular expressions search at stage 215 produces a result, then at stage 220 the email client can check for a matching entry in the links table for the resulting term. This stage can include accessing the locally stored links table and searching a first column of the links table for a term that matches the result from stage 215. If the links table includes an entry for that result, along with an accompanying URL listed in a second column of the links table, then the email client can extract the URL from the table at stage 245 and continue the method from that point.

However, if the links table does not include an entry for the result—or if the links table includes an entry but does not include any URL in the second column for that entry—then the method can proceed to stage 225. At stage 225, the email client can send an object request to the mobile flows server. The object request can provide the result of the regular expressions search from stage 215 and request an object for that result that includes a URL.

The mobile flows server can receive the object request and retrieve an object associated with a backend system at stage 230. In some examples, the mobile flows server parses the object request to determine which backend system, or systems, the search result applies to. The mobile flows server can store an association table in some examples, identifying a corresponding backend system for each potential search result.

For example, a result such as "APF-40" can be associated with JIRA, a project tracking software and system. The mobile flows server can access a JIRA backend using a connector stored at the mobile flows server. The connector can be one or more pieces of code that provides authorized access to a JIRA server or database. The mobile flows server can use this connector to access the JIRA backend and retrieve information regarding the term "APF-40." For example, the mobile flows server can retrieve a URL describing a web location or server location associated with that term as part of stage 230. The connector can also include one or more queries, stored procedures, or application programming interface ("API") calls to make to the backend to perform an action.

In another example, the search result at stage 215 can be the term "0069000000F4N," which is associated with a particular SALESFORCE item. The mobile flows server can use a SALESFORCE-specific connector to access a server or database associated with SALESFORCE. The mobile flows server can retrieve a URL describing a web or server location associated with the identified item. The mobile flows server can retrieve the URL as part of stage 230.

In yet another example, the search result at stage 215 can include an email address in the form of name@domain.com. The mobile flows server can use the email address to access one or more backend systems associated with the address. Using a first connector, the mobile flows server can access a LINKEDIN backend system to retrieve a URL directed to a LINKEDIN profile associated with that email address. Using a second connector, the mobile flows server can access a SALESFORCE backend system to retrieve a URL associated with a contact card associated with that email address. In this example, the mobile flows server can retrieve both URLs at stage 230.

At stage 235, the mobile flows server can provide an object response to the email client. The object response can include a term-URL pairing that includes a term (or group of terms) from the draft email that matches the regular expressions search, along with a corresponding URL (or group of corresponding URLs). The object can have a JSON object structure, for example.

Each of the three example search terms described above can result in a separate object response at stage 235. For example, the term "APF-40" can have an object response that pairs the term "APF-40" with a URL such as "https://jira-euc.eng.vmware.com/jira/browse/APF-40." Similarly, the term "0069000000F4N" can have an object response that pairs the term "0069000000F4N" with a URL such as "https://ap1.salesforce.com/0069000000F4Nqs." Finally, the term "name@domain.com" can have an object response that pairs the term "name@domain.com" with two URLs such as "https://www.linkedin.com/in/name" and "https://ap1.salesforce.com/lightning/contact/001B0hj 6870xx/view."

The email client can receive the object response and update the links table stored locally at the user device at stage 240. For example, the email client can fill an empty row in the table with the search term in a first column and the corresponding URL or URLs in the second column of the same row. In examples where multiple URLs apply to a single search term, the email client can either create multiple entries for the same search term, or can list multiple URLs for a single search term.

At stage 245, the email client can retrieve the URL from the links table for the search term at issue. The email client can then apply the associated URL at stage 250, creating a hyperlink in the draft email that links the search term at issue with the URL. In circumstances where multiple URLs are available, the email client can choose between the URLs based upon a ranking order provided by the mobile flows server. For example, the mobile flows server can provide instructions that URLs relating to SALESFORCE have a higher ranking that URLs relating to LINKEDIN, in which case the email client can default to using the SALESFORCE URL.

In another example, the email client can apply a machine learning algorithm to determine whether the words or sentences surrounding the search term indicate that one URL is more relevant than the other, and then use the more relevant URL for the hyperlink. The machine learning algorithm can take into account, for example, whether other terms in the email have corresponding URL entries, and if so, whether those URL entries indicate sufficient context to choose between the available URLs for the term at issue. In yet another example, the email client can present an option for the user to select between the URLs. For example, the email client can present multiple graphical elements, each corresponding to an available URL, and the user can select one of those graphical elements to apply the URL.

The email client can apply the URL at stage 250, such as by adding a hyperlink to the regular expression to which it pertains. After applying the URL at stage 250, the method can return to 215 to perform additional searches as the user continues typing in the draft email. Additional hyperlinks can be applied to additional terms by following the same stages described above. When the user elects to send the draft email, the email client can send the email at stage 255 with relevant hyperlinks applied.

Figure 3:
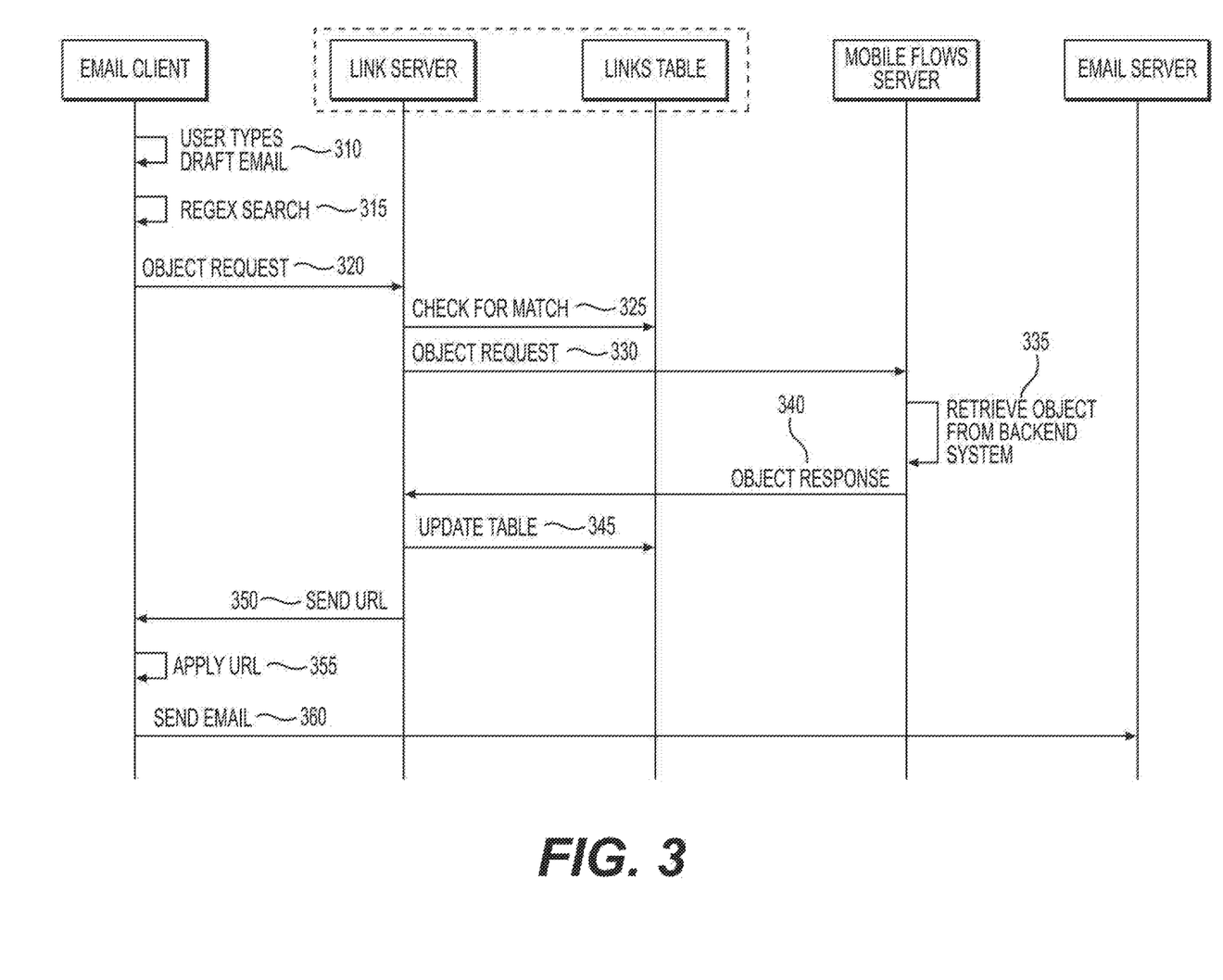
FIG. 3 is a sequence diagram of another example method for providing hyperlinks in a draft email on a user device.

FIG. 3 provides a sequence diagram of an example method for providing hyperlinks in a draft email on a user device, using a link server and a links table that is stored at the link server. In the drawing, the link server and links table are associated with a dashed-line box to indicate that the two are associated with one another.

At stage 310, a user can begin typing a draft email in the email client. This stage is similar to stage 210 of FIG. 2. The draft email can be launched using known techniques within the email client, such as selecting an icon associated with creating a new email or selecting an icon associated with replying to or forwarding an email. The user can then simply begin typing in the draft email.

The email client can detect the typing by the user and perform a regular expressions search at stage 315, which is similar to stage 215 of FIG. 2. The regular expressions search can utilize any number of regular expressions stored at the user device and accessible by the email client. The regular expressions can be provided by a remote server, such as the mobile flows server described in later stages. The regular expressions stored at the user device can be updated by the server when new expressions are available or when the server otherwise communicates with the user device, as described above with respect to FIG. 1.

The email client can perform regular expressions searches according to various rules or schedules. In one example, the searches can be performed periodically, based on a predetermined time period. The email client can begin a timer when a draft email is launched or when a user begins typing in a draft email. When the timer expires, the email client can perform a search on the text of the draft email and start a new timer. When the new timer expires, the email client can search either the full text of the draft email or only the text added since the previous search, and also begin another timer. This process can then be repeated.

In some examples, when a search result is generated at stage 315, the email client can check a locally saved links table, as described in stage 220 of FIG. 2. This stage can include accessing the locally stored links table and searching a first column of the links table for a term that matches the result from stage 315. If the links table includes an entry for that result, along with an accompanying URL listed in a second column of the links table, then the email client can extract the URL from the table and apply it, skipping directly to stage 355 and continuing the method from there.

However, if the local links table does not include a URL associated with the result from stage 315, or if the email client does not have access to a locally stored links table, then at stage 320 the email client can request an object from a link server. The link server can be a server, including at least a processor and a memory storage, that is located remotely from the user device. The links server can maintain a links table in the memory storage of the server. The object request can provide the result of the regular expressions search from stage 315 and request an object for that result that includes a URL.

Upon receiving the object request, the link server can first check the links table stored at the server at stage 325. For example, the link server can search the first column of the links table for a term that matches the result from stage 315. If an entry matches the result, then the link server can inspect a second column of the same row for that entry to determine if a URL is provided. If a URL is available, the link server can retrieve the URL and return it to the email client at stage 350. If no entry in the links table matches the result, or if an entry exists but no URLs are listed for the entry, then the method can continue to stage 330.

At stage 330, the link server sends an object request to the mobile flows server. Similar to the request at stage 320, the object request can identify a term from stage 315 and request an object for that term that includes a URL. The mobile flows server can receive the object request and retrieve an object associated with a backend system at stage 335. In some examples, the mobile flows server parses the object request to determine which backend system, or systems, the search result applies to. The mobile flows server can store an association table identifying a corresponding backend system for each potential search result.

At stage 340, the mobile flows server can provide an object response to the link server. The object response can include a term-URL pairing that includes a term (or group of terms) from the draft email that matches the regular expressions search, along with a corresponding URL (or group of corresponding URLs). The object can have a JSON object structure, for example. The object response can be similar to the examples described with respect to stage 235 of FIG. 2.

The link server can receive the object response and update the links table stored at the server at stage 345. For example, the link server can fill an empty row in the table with the search term in a first column and the corresponding URL or URLs in the second column of the same row. In examples where multiple URLs apply to a single search term, the link server can either create multiple entries for the same search term, or can list multiple URLs for a single search term.

At stage 350, the link server can send the URL to the email client. This stage can include sending an object that includes a word-URL pairing, where the word (or words) of the pairing correspond to the result from the search at stage 315. The email client can then apply the associated URL at stage 355, creating a hyperlink in the draft email that links the search result at issue with the URL. In examples where multiple URLs are available for the search result, the email client can choose between the URLs or provide the user an opportunity to select a URL, as explained previously with respect to stage 250 of FIG. 2.

After applying the URL at stage 355, the method can return to 315 to perform additional searches as the user continues typing in the draft email. Additional hyperlinks can be applied to additional terms by following the same stages described above. When the user elects to send the draft email, the email client can send the email at stage 360 with relevant hyperlinks applied.

Figure 4:
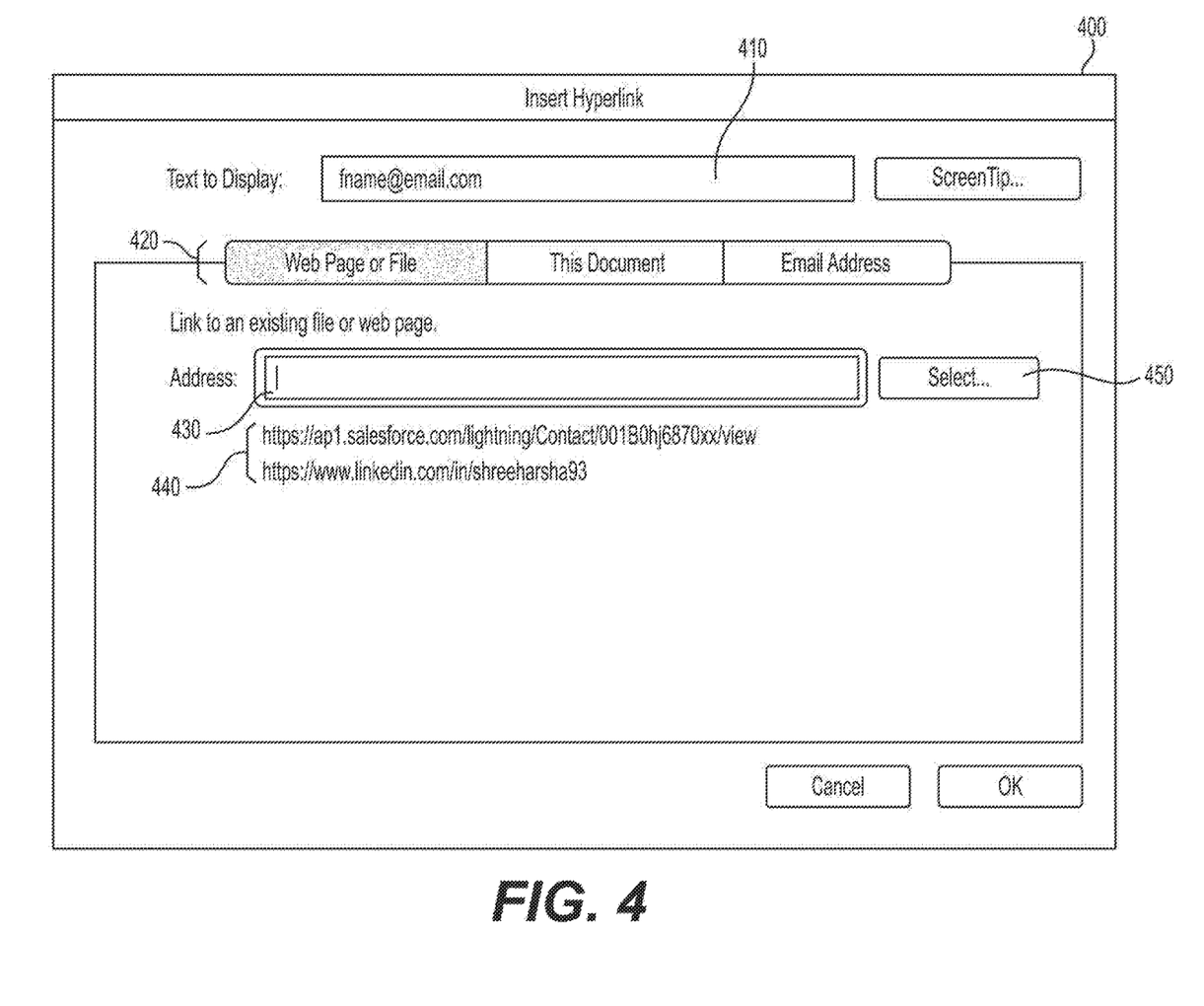
FIG. 4 is an illustration of an example graphical user interface ("GUI") of a user device used to perform the various methods described herein.

FIG. 4 provides an illustration of an example GUI 400 of a user device. This GUI 400 can be displayed as a window on top of another GUI displaying the email client, for example. The GUI 400 can launch based on a variety of triggering actions that a user can perform manually. In one example, a triggering action includes a user selecting a word or phrase of a draft email and selecting an "insert hyperlink" option. The option can be presented based on a right-mouse-button click or a finger press after highlighting the word, for example. In another example, the triggering action includes the user selecting a graphical element displayed within the draft email in the email client. The graphical element can be highlighting, underlining, or a badge applied to a word of the draft email. When selected, the graphical element can cause the GUI 400 of FIG. 4 to be displayed.

The GUI 400 can include a field 410 for determining the text to be displayed in the email. By default, the term that triggers the GUI 400 can be listed in this field 410. In the example of FIG. 4, an email address triggered the GUI 400 and is therefore listed in the field 410. The user can optionally change the text in this field 410 to replace that text in the draft email.

Selection buttons 420 can be provided in the GUI 400 for selecting types of information to link to the displayed text. In this example, one of the buttons 420 can be used to select a web page or file, as shown in FIG. 4. A second button 420 can be used to refer back to portions of the document or email in which the user is working. A third button 420 can be used to fill in an email address. When the first button 420 is selected, as in FIG. 4, an address field 430 can be displayed for a link to an existing file or web page. The user can utilize a "select" button 450 to select a file location stored locally at the user device.

In examples where a links table has provided one or more URLs associated with a search result, then the GUI 400 can include one or more URL suggestions 440. In the example of FIG. 4, the system has provided two URL suggestions 440. These suggestions 440 can be based on entries in a links table. In this example, the term "fname@email.com" can occupy a cell in a first column of the links table. The second column in the same row of that links table can include two URLs, which are then displayed in the GUI 400 as URL suggestions 440. In one example, a user can click or press either URL suggestion 440 to populate the URL field 430 with that URL. The URL suggestions 440 can be obtained from a mobile flows server with access to various backend systems, as described in previous examples.

Although the example of FIG. 4 involves manual steps by a user, the systems and methods described herein can be performed automatically. For example, a user can elect to turn on an "auto-hyperlink" feature of the email client. In this example, words of a draft email can be hyperlinked automatically as the user is drafting the email. This can be performed as described with respect to FIGS. 1-3. In other examples, however, the user can select a piece of text and choose an "insert link" option within the email client. In that example, the user can be presented with a GUI such as the one shown in FIG. 4.

Additionally, the user can configure settings for hyperlink suggestions within the email client. At a high level, the user can turn on an automatic hyperlink feature, as mentioned previously. But this feature can be fine-tuned by enabling or disabling specific backend systems for the automatic hyperlink features. In one example, the mobile flows server is capable of providing URLs associated with four separate backend systems: SALESFORCE, JIRA, LINKEDIN, and SLACK. The email client can provide a configuration interface where the user can select each of these backend systems individually, causing them to be enabled or disabled. For example, the user can select a button, slider, or other graphical element associated with each backend system to enable or disable that system. In this manner, the user can customize the automatic hyperlinks that the email client will provide.

In scenarios where the user disables automated hyperlinks for particular backend systems, the links table can either purge entries related to that system or store them for potential use in the future. In some examples, the email client includes functionality for determining the backend system associated with a URL stored in the links table. For example, the email client can look for patterns in the URLs to determine which system each URL is associated with. In another example, the links table includes a third column that identifies a backend system. When the email client is parsing the links table to retrieve URLs to suggest to the user, the email client can cross-check the third column to ensure that the user has opted in to receiving a suggestion for that particular URL. Similarly, the links table can be divided into multiple links tables or otherwise divided to indicate which backend systems have been whitelisted for hyperlink suggestions.

Figure 5:
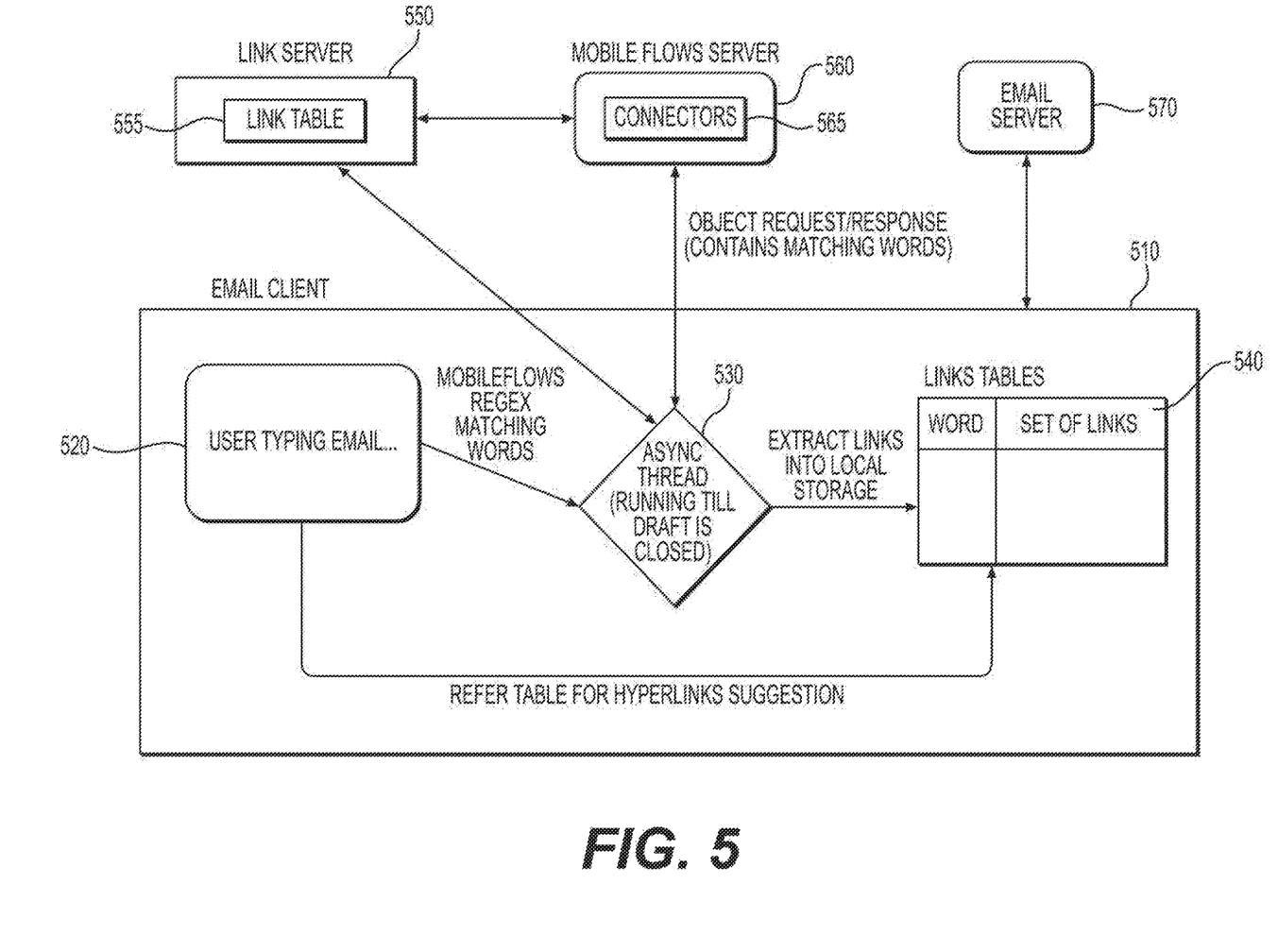
FIG. 5 is an illustration of a system for providing hyperlinks in a draft email on a user device.

FIG. 5 provides an illustration of a system for carrying out the various methods described herein. The system of FIG. 5 can include an email client 510, such as VMWARE's BOXER client, that is executing on a user device. The user device itself is not shown but can be any computing device having a processor and memory storage. For example, the user device can be a phone, laptop computer, desktop computer, or tablet.

The email client 510 of FIG. 5 includes various components. For example, the email client 510 includes a draft email 520 representing an unsent email that a user is currently drafting. The draft email 520 can refer to a links table 540 that is stored locally at the user device. In this drawing, the links table 540 is depicted as part of the email client 510 itself, but the links table 540 can be a separate file or folder stored locally at any storage location of the user device. For example, the links table 540 can be a relational table or an XML file stored locally on the user device and can be accessible to, and editable by, the email client 510.

An asynchronous thread 530 can execute within the email client 510 while the draft email is open. The asynchronous thread 530 can be a programmed unit of work that runs separately from the primary thread executing the email client 510. The asynchronous thread 530 can therefore take actions behind the scenes without waiting for responses or acknowledgements from the primary thread executing the email client 510 itself.

For example, the asynchronous thread 530 can receive terms from the draft email 520 that match a regular expressions search. In some examples, the asynchronous thread 530 can perform the search itself using the relevant regular expressions. In other examples, the email client 510 performs the search and forwards any matching results to the asynchronous thread 530. The regular expressions searches can be saved locally at the user device. The regular expressions searches can be provided to the user device by the mobile flows server 560. For example, the email client 510 can prompt the user to opt-in to the mobile flows platform, and upon the user opting in, the mobile flows server 560 can send the regular expressions searches to be carried out on draft emails 520.

In some examples, the asynchronous thread 530 receives a term that matches a regular expression based on that term's absence from the local links table 540. In other words, the email client 510 can check the local links table 540 first before forwarding a term to the asynchronous thread 530. In other examples, the asynchronous thread 530 itself can check the local links table 540 on behalf of the email client 510.

In examples where the asynchronous thread 530 has identified or received a term that matches a regular expressions search but is not listed in the local links table 540, the asynchronous thread 530 can reach out to one or more servers to obtain object information regarding the matching term. In one example, the asynchronous thread 530 can contact the mobile flows server 560 to request an object response. The request can include information identifying the user, user device, email client 510, or some combination thereof. The request can also identify the term matching the regular expression. The request can also identify the regular expression that the term matches. The request can include any other useful information, such as whether the user has opted in to the mobile flows system, the compliance status of the user device, the geographic location of the user device, and the battery level of the user device.

The mobile flows server 560 can utilize one or more connectors 565 that provide access to a backend system, such as a third-party service. A connector 565 can be executable code that accesses information stored by, or relating to, a backend system. For example, a connector 565 can utilize a third-party specific API to retrieve information from a third-party system. A connector 565 can utilize APIs to connect to internal backend systems as well as external, third-party backend systems. The connector 565 can request an object response that includes a URL relating to the search term provided by the asynchronous thread 530. The URL can point to a web portal, a server location, or file storage location relating to the search term. The mobile flows server 560 can respond directly to the asynchronous thread 530 in some examples, providing the object response that includes the URL.

In some examples, the asynchronous thread 530 can reach out to a link server 550 rather than the mobile flows server 560. The link server 550 can store a remote links table 555, for example by storing the links table 555 in a memory storage of the link server 550. In this sense the remote links table 555 is remote from the user device but not from the link server 550 itself. When the link server 550 receives a request from the asynchronous thread 530, the link server 550 can first search the remote links table 555 to determine if it contains the matching term and an associated URL. If so, it can return an object response to the asynchronous thread 530 identifying the URL.

If the remote links table 555 does not include the requested information, the link server 550 can provide an object request to the mobile flows server 560. The mobile flows server 560 can utilize one or more connectors 565 to obtain the object from relevant backend servers, as described previously. The mobile flows server 560 can then return an object, including a relevant URL, to the link server 550. The link server 550 can update its remote links table 555 and provide an object response to the asynchronous thread 530.

In some examples, the link server 550 can handle requests from multiple users within an enterprise. For example, an enterprise with 1,000 employees can utilize a single link server 550 that handles all object requests for terms matching regular expressions searches. The link server 550 can update the remote links table 555 any time an object is requested, thereby building a more comprehensive table than would be built by a single user. This can increase the efficiency of the link server 550 by reducing duplicate requests across different users. Once the link server 550 obtains a URL for a particular search term for a first user, when a second user requests the URL for that same term, the link server 550 can simply retrieve the URL from the remote links table 555 rather than requesting it from the mobile flows server 560 again.

In some examples, the link server 550 can store multiple remote links tables 550 that correspond to different groups within an enterprise. The groups can be configured by an administrator of the enterprise. For example, a first group can correspond to a software development team that utilizes certain backend systems, such as JIRA. The link server 550 can maintain a developer links table 550 that includes term-URL pairs corresponding to all requests made by users within the developer group. A second group can correspond to a sales team that utilizes sales software such as SALESFORCE. The link server 550 can maintain a sales links table 550, separate from the developer links table 550, that includes term-URL pairs corresponding to all requests made by users within the sales group. In this way, users in the sales group will get fewer URL suggestions pertaining to a less-relevant backend system (e.g., JIRA). Similarly, users in the development group will get fewer URL suggestions pertaining to a less-relevant backend system for those users (e.g., SALESFORCE).

Having received an object response from either the link server 550 or the mobile flows server 560, the asynchronous thread 530 can extract a URL from the object response and update the local links table 540 stored on the user device. The email client 510 can then insert the URL into the draft email 520. When the user elects to send the draft email 520, it can be transmitted to an email server 570 that sends the email according to known techniques.

Although depicted as separate servers, the functionalities described with respect to the email server 570, mobile flows server 560, and link server 550 can be implemented in any number of servers. For example, the functionalities of these components can be incorporated into a single server. The functionalities can also be broken out into more servers than depicted in FIG. 5. The depictions and discussions herein are not intended to limit the subject matter to particular servers or to a particular number of servers.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a Uniform Resource Locator address ("URL") to an email client executing on a user device, the method comprising:
   receiving, at a server remote from the user device, an object request that includes a term,
      wherein the term is extracted from a draft email in process of being drafted in the email client, the extraction performed based on a regular expressions search performed on the text of the draft email by an asynchronous thread separate from a primary thread executing on the email client, the search identifying the term based on a matching regular expression in the text of the draft email, and
      wherein the object request to the remote server is based, at least in part, on the asynchronous thread performing a search for the term within a links table stored locally at the user device, the search not returning a match within the links table;
   searching, by the remote server, a remote links table stored at the remote server, wherein the remote links table comprises word-URL pairings generated from emails from a plurality of different users;
   determining by the remote server that the remote links table did not return a match;
   requesting the object, by the remote server, from a different server separate from the email client and the remote server;
   receiving an object response from the different server that includes the term and a URL;
   updating the remote links table to include a new word-URL pairing based on the term and URL from the object response; and
   providing the object response to the email client, wherein the asynchronous thread of the email client:
      extracts the URL from the object response; and
      inserts a hyperlink in the draft email for the term using the URL from the object response.

2. The method of claim 1, wherein the email client updates links table stored locally at the user device to include the term and URL from the object response.

3. The method of claim 1, wherein the different server is associated with a backend system that supports an application, other than the email client, that executes on the user device.

4. The method of claim 1, wherein requesting the object from the different server comprises invoking a preconfigured connector function that provides an interface with the different server.

5. The method of claim 4, wherein the connector function is an Application Programming Interface ("API") call.

6. The method of claim 1, wherein the different server is a database server.

7. The method of claim 1, wherein inserting the hyperlink in the draft email is performed in response to the user selecting at least one word from the draft email.

8. A non-transitory, computer-readable medium containing instructions that, when executed by a hardware-based processor, performs stages for providing a Uniform Resource Locator address ("URL") to an email client executing on a user device, the stages comprising:
   receiving, at a server remote from the user device, an object request that includes a term,
      wherein the term is extracted from a draft email in process of being drafted in the email client, the extraction performed based on a regular expressions search performed on the text of the draft email by an asynchronous thread separate from a primary thread executing on the email client, the search identifying the term based on a matching regular expression in the text of the draft email, and
      wherein the object request to the remote server is based, at least in part, on the asynchronous thread performing a search for the term within a links table stored locally at the user device, the search not returning a match within the links table;
   searching, by the remote server, a remote links table stored at the remote server, wherein the remote links table comprises word-URL pairings generated from emails from a plurality of different users;
   determining by the remote server that the remote links table did not return a match;
   requesting the object, by the remote server, from a different server separate from the email client and the remote server;
   receiving an object response from the different server that includes the term and a URL;
   updating the remote links table to include a new word-URL pairing based on the term and URL from the object response; and
   providing the object response to the email client, wherein the asynchronous thread of the email client:
      extracts the URL from the object response; and
      inserts a hyperlink in the draft email for the term using the URL from the object response.

9. The non-transitory, computer-readable medium of claim 8, wherein the email client updates links table stored locally at the user device to include the term and URL from the object response.

10. The non-transitory, computer-readable medium of claim 8, wherein the different server is associated with a backend system that supports an application, other than the email client, that executes on the user device.

11. The non-transitory, computer-readable medium of claim 8, wherein requesting the object from the different server comprises invoking a preconfigured connector function that provides an interface with the different server.

12. The non-transitory, computer-readable medium of claim 11, wherein the connector function is an Application Programming Interface ("API") call.

13. The non-transitory, computer-readable medium of claim 8, wherein the different server is a database server.

14. The non-transitory, computer-readable medium of claim 8, wherein inserting the hyperlink in the draft email is performed in response to the user selecting at least one word from the draft email.

15. A server for providing a Uniform Resource Locator address ("URL") to an email client executing on a user device, comprising:
a memory storage including a non-transitory, computer-readable medium comprising instructions; and
a hardware-based processor that executes the instructions to carry out stages comprising:
receiving, at the server, an object request that includes a term,
wherein the term is extracted from a draft email in process of being drafted in the email client, the extraction performed based on a regular expressions search performed on the text of the draft email by an asynchronous thread separate from a primary thread executing on the email client, the search identifying the term based on a matching regular expression in the text of the draft email, and
wherein the object request to the server is based, at least in part, on the asynchronous thread performing a search for the term within a links table stored locally at the user device, the search not returning a match within the links table;
searching, by the server, a remote links table stored at the server, wherein the remote links table comprises word-URL pairings generated from emails from a plurality of different users;
determining by the server that the remote links table did not return a match;
requesting the object, by the server, from a different server separate from the email client and the server;
receiving an object response from the different server that includes the term and a URL;
updating the remote links table to include a new word-URL pairing based on the term and URL from the object response; and
providing the object response to the email client, wherein the asynchronous thread of the email client:
extracts the URL from the object response; and
inserts a hyperlink in the draft email for the term using the URL from the object response.

16. The server of claim 15, wherein the email client updates links table stored locally at the user device to include the term and URL from the object response.

17. The server of claim 15, wherein requesting the object from the different server comprises invoking a preconfigured connector function that provides an interface with the different server.

18. The server of claim 17, wherein the connector function is an Application Programming Interface ("API") call.

19. The server of claim 15, wherein the different server is a database server.

20. The server of claim 15, wherein inserting the hyperlink in the draft email is performed in response to the user selecting at least one word from the draft email.

\* \* \* \* \*